(12) United States Patent
Chen et al.

(10) Patent No.: US 11,767,433 B2
(45) Date of Patent: Sep. 26, 2023

(54) METHOD FOR FORMING A TITANIA-COATED INORGANIC PARTICLE

(71) Applicant: AGENCY FOR SCIENCE, TECHNOLOGY AND RESEARCH, Singapore (SG)

(72) Inventors: Chao Chen, Singapore (SG); Xu Li, Singapore (SG); Suxi Wang, Singapore (SG); Xikui Zhang, Singapore (SG); Siew Yee Wong, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 187 days.

(21) Appl. No.: 17/161,647

(22) Filed: Jan. 28, 2021

(65) Prior Publication Data

US 2021/0147690 A1    May 20, 2021

Related U.S. Application Data

(62) Division of application No. 16/326,691, filed as application No. PCT/SG2017/050406 on Aug. 16, 2017, now Pat. No. 10,941,298.

(30) Foreign Application Priority Data

Aug. 19, 2016    (SG) ............................ 10201606951U

(51) Int. Cl.
| | | |
|---|---|---|
| *C08K 3/34* | (2006.01) | |
| *C09C 3/06* | (2006.01) | |
| *C09D 7/62* | (2018.01) | |
| *C09D 7/40* | (2018.01) | |
| *C09D 5/33* | (2006.01) | |
| *C09C 1/28* | (2006.01) | |
| *C08K 9/02* | (2006.01) | |
| *C08K 7/28* | (2006.01) | |
| *C08K 7/26* | (2006.01) | |
| *C08K 3/22* | (2006.01) | |
| *C08K 3/36* | (2006.01) | |
| *C08K 3/40* | (2006.01) | |
| *C08K 7/20* | (2006.01) | |

(52) U.S. Cl.
CPC ............... *C09C 3/063* (2013.01); *C09C 1/28* (2013.01); *C09D 5/004* (2013.01); *C09D 7/62* (2018.01); *C09D 7/70* (2018.01); *C01P 2002/72* (2013.01); *C01P 2004/02* (2013.01); *C01P 2004/03* (2013.01); *C01P 2004/32* (2013.01); *C01P 2004/61* (2013.01); *C01P 2004/84* (2013.01); *C01P 2006/10* (2013.01); *C08K 3/34* (2013.01); *C08K 3/36* (2013.01); *C08K 3/40* (2013.01); *C08K 7/20* (2013.01); *C08K 7/26* (2013.01); *C08K 7/28* (2013.01); *C08K 9/02* (2013.01); *C08K 2003/2241* (2013.01); *C08K 2201/005* (2013.01)

(58) Field of Classification Search
CPC .......... C09C 3/063; C09D 5/004; C09D 7/62; C09D 7/70; C01P 2004/32; C01P 2004/71; C01P 2004/84; C01P 2006/10; C08K 3/34; C08K 3/36; C08K 3/04; C08K 7/20; C08K 7/26; C08K 7/28; C08K 9/02; C08K 2003/2241; C08K 2201/005
USPC ........................................................ 523/217
See application file for complete search history.

(56) References Cited

U.S. PATENT DOCUMENTS

| | | | |
|---|---|---|---|
| 4,898,892 A | 2/1990 | Melber et al. | |
| 7,744,952 B2 | 6/2010 | Huang et al. | |
| 8,871,272 B2 | 10/2014 | Kong et al. | |
| 10,941,298 B2 * | 3/2021 | Chen | ............ C09C 3/063 |
| 2015/0299417 A1 | 10/2015 | Masuda et al. | |
| 2022/0089881 A1 * | 3/2022 | Li | ............ B01J 21/063 |

FOREIGN PATENT DOCUMENTS

| | | |
|---|---|---|
| EP | 2525011 A1 | 11/2012 |
| JP | 2013136498 A | 7/2013 |

OTHER PUBLICATIONS

The International Preliminary Report on Patentability of PCT Application No. PCT/SG2017/050406, dated Feb. 19, 2019, 5 pages.

Anandan et al., "Amorphous mania-coated magnetite spherical nanoparticles: sonochemical synthesis and catalytic degradation of nonylphenol ethoxylate", Industrial & Engineering Chemistry Research, May 30, 2011, 8 pages, vol. 50, No. 13.

Baetens et al., "Aerogel insulation for building applications: A state-of-the-art review", Energy and Buildings, Dec. 15, 2010, 9 pages, vol. 43, Issue 4.

(Continued)

*Primary Examiner* — Hannah J Pak

(74) *Attorney, Agent, or Firm* — Womble Bond Dickinson (US) LLP

(57) ABSTRACT

A method of forming a titania-coated inorganic particle comprising the steps of (a) stirring a mixture of a titania precursor such as a titanium alkoxide and an inorganic particle such as a hollow glass particles in an organic solvent such as an alcohol for more than 1 h to cause adsorption of the titania precursor on the surface of the inorganic particle; and (b) adding water dropwise to the mixture under stirring to convert the titania precursor to titania which then forms a coating on the inorganic particle. A method for forming a paint formulation, a titania-coated inorganic particle, a paint formulation comprising a titania-coated inorganic particle and use of a titania-coated inorganic particle in a paint formulation is also described.

3 Claims, 10 Drawing Sheets

(56) References Cited

OTHER PUBLICATIONS

Baetens et al., "Phase change materials for building applications: A state-of-the-art review", Energy and Buildings, Apr. 7, 2010, 8 pages, vol. 42, Issue 9.
Holgado et al., "Three-dimensional arrays formed by monodisperse TiO2 coated on SiO2 spheres", Journal of Colloid and Interface Science, Sep. 1, 2000, 6 pages, vol. 229, No. 1.
Karches et al., "Piasma-CVD-coated glass beads as photocatalyst for water decontamination", Catalysis Today, Mar. 15, 2002, 13 pages, vol. 72, No. 3-4.
Liu et al., "Preparation and self-assembly of uniform TiO2/SiO2 composite submicrospheres", Journal of Colloid and Interface Science, Aug. 1, 2005, 5 pages, vol. 288, No. 1.
Ocana et al., "Preparation and properties of uniform-coated colloidal particles. 6. titania on zinc oxide", Langmuir, Dec. 1, 1991, 6 pages, vol. 7, No. 12.
The International Search Report and Written Opinion of the Search authority for PCT/SG2017/050406, dated Oct. 31, 2017, 9 pages.
Machine Translation of JP 2013-136498, Jul. 11, 2013, 27 pages.
Paz et al., "Photo-oxidatively self-cleaning transparent, titanium dioxide films on soda-lime glass: The deleterious effect of sodium contamination and its prevention", Journal of Materials Research, Mar. 3, 1997, 8 pages.
Liao et al., "Preparation and property of Amorphous titania-coated zinc oxide nanoparticles," Journal of Solid State Chemistry, Apr. 1, 2006, 7 pages.

\* cited by examiner

[Fig. 2]
(a)
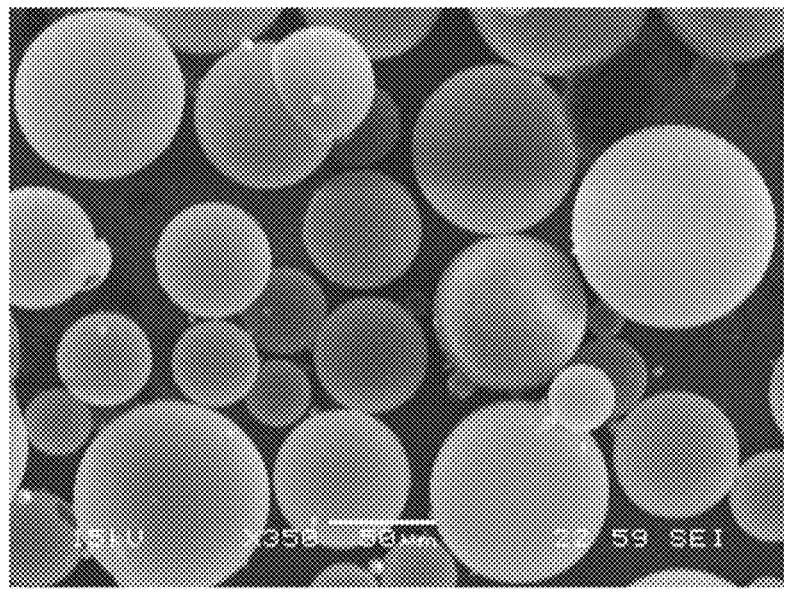
(b)
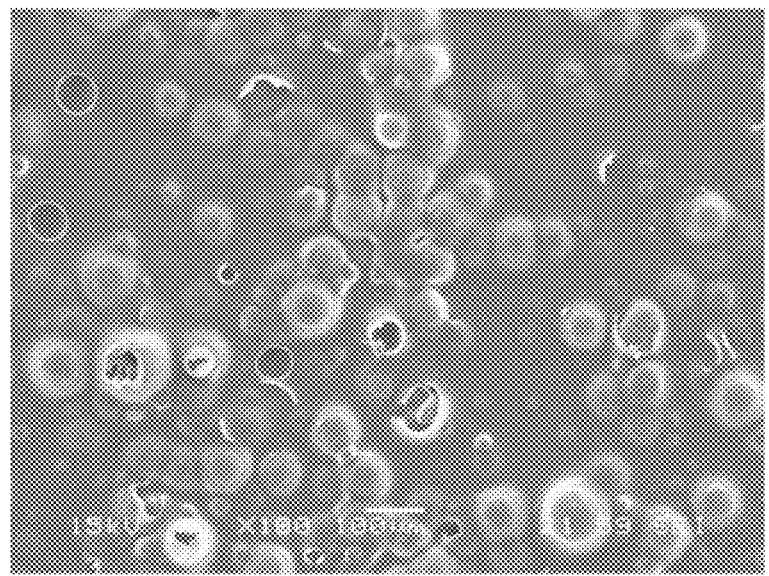

[Fig. 3]
(a)
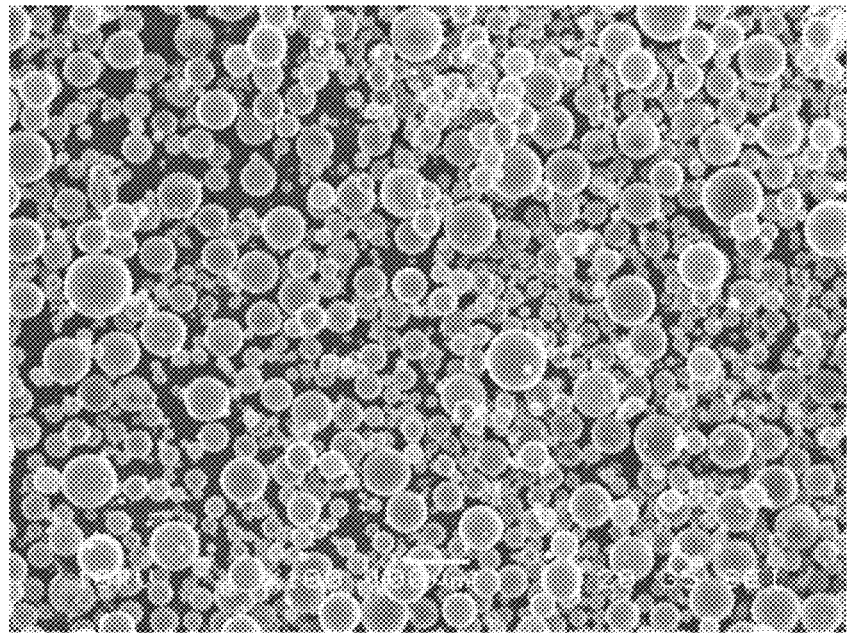
(b)
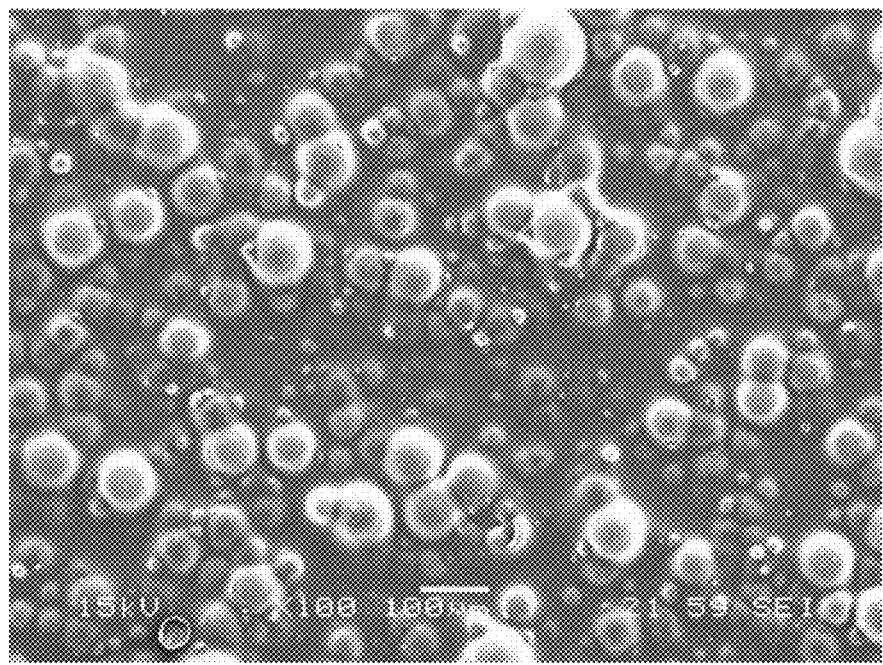

[Fig. 4]
(a)
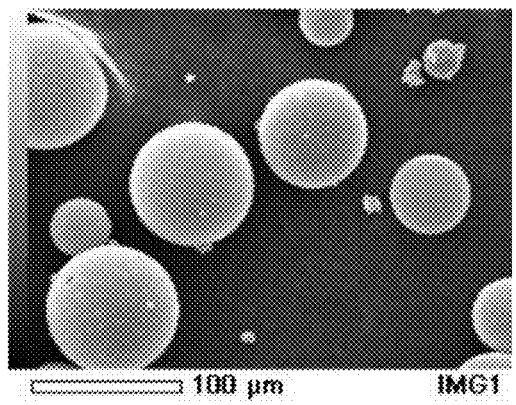
(b)
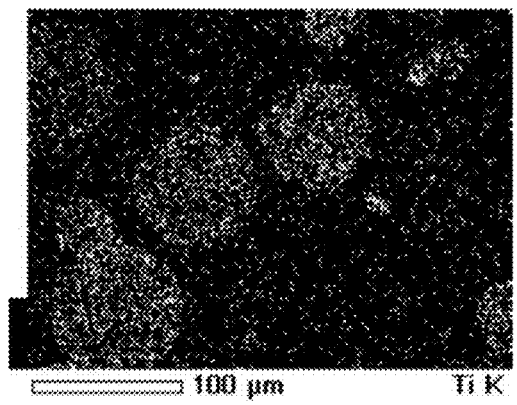
(c)
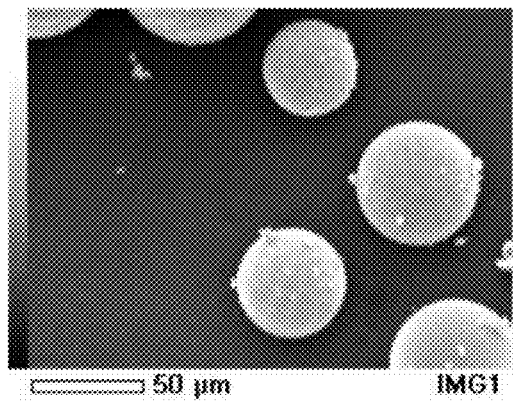
(d)
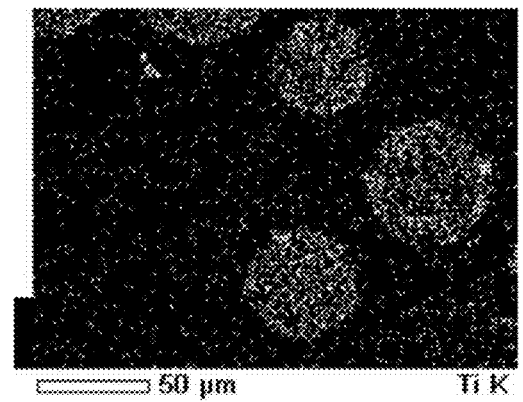

[Fig. 5]
(a)
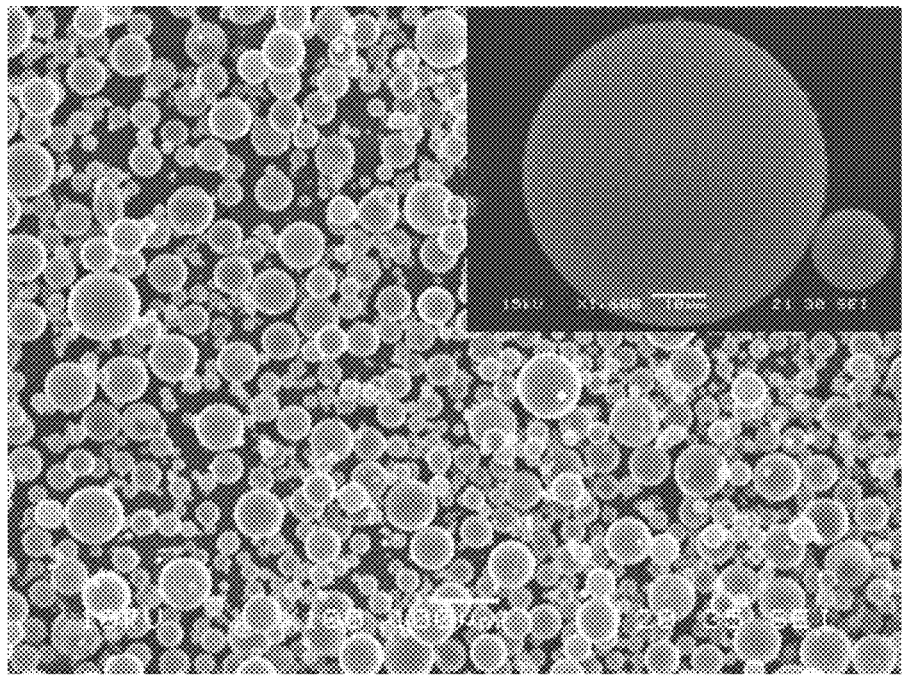
(b)
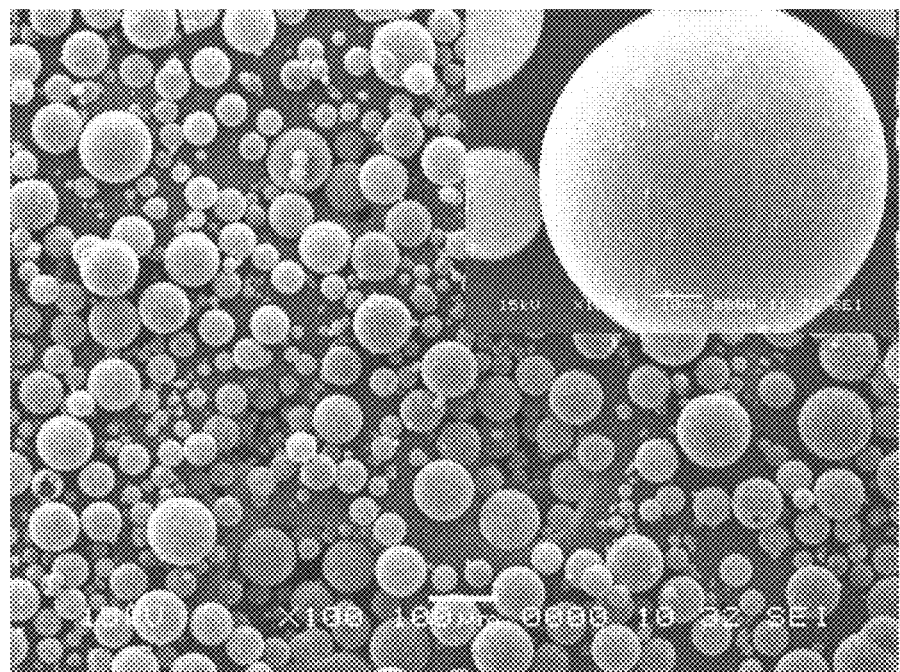

[Fig. 5]
(c)
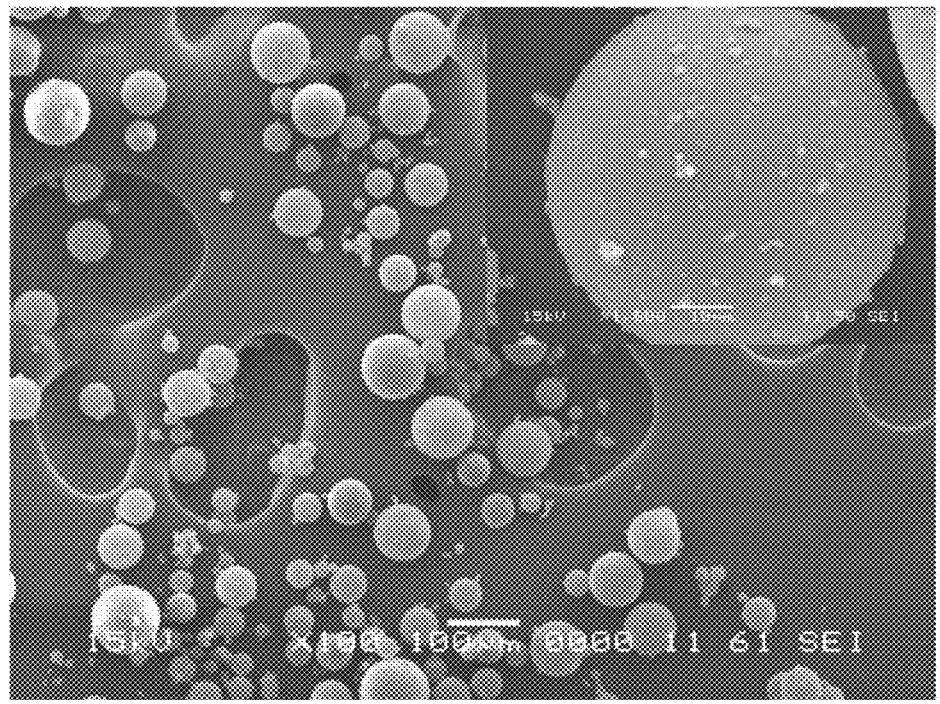
(d)
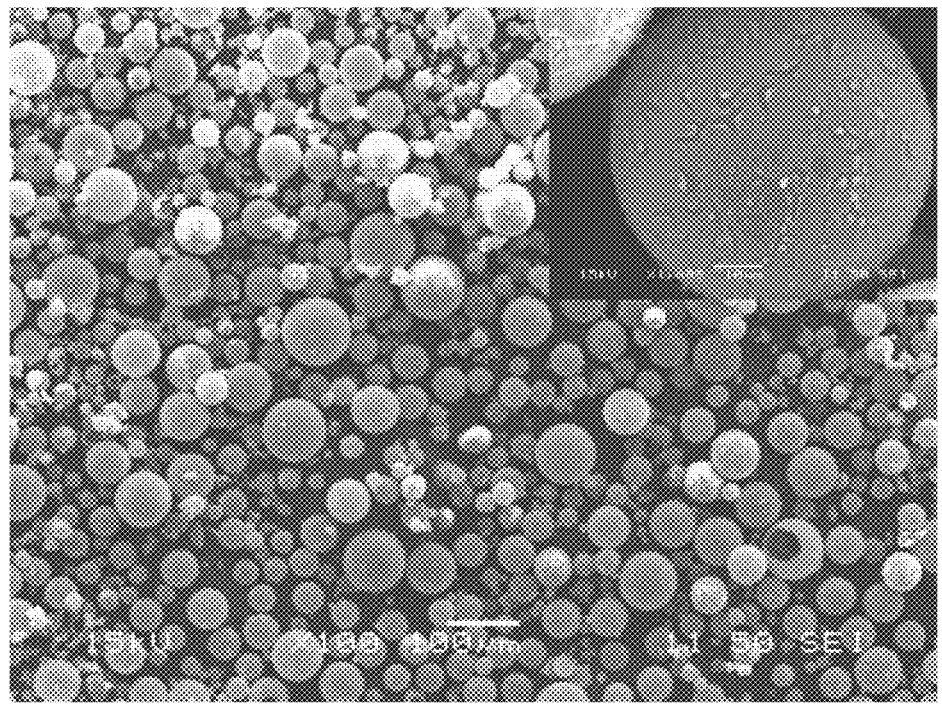

[Fig. 6]
(a)
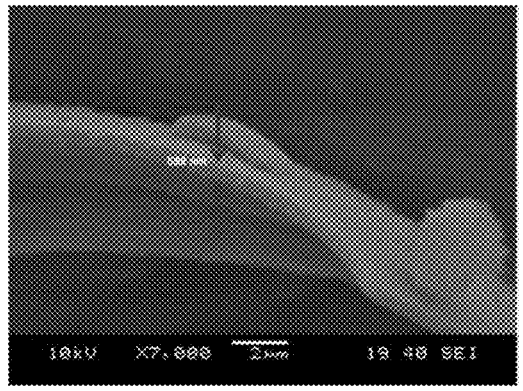
(b)
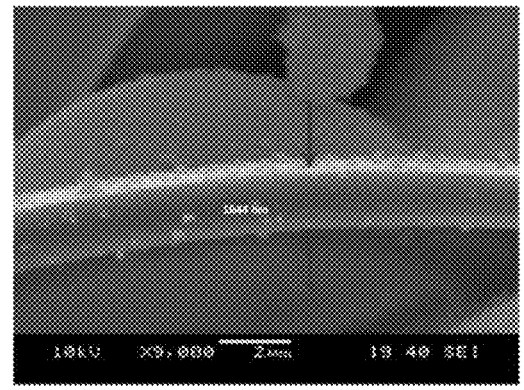
(c)
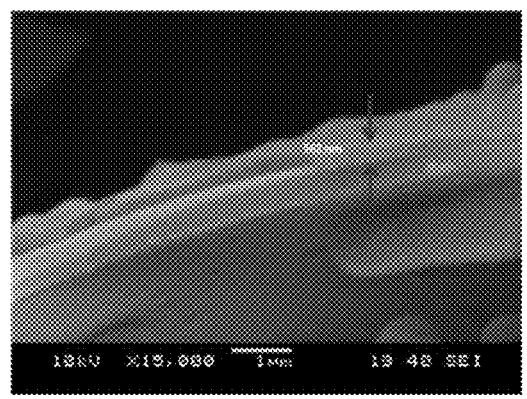
(d)
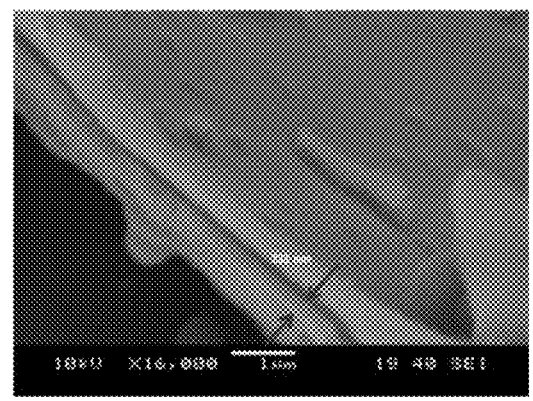
[Fig. 7]
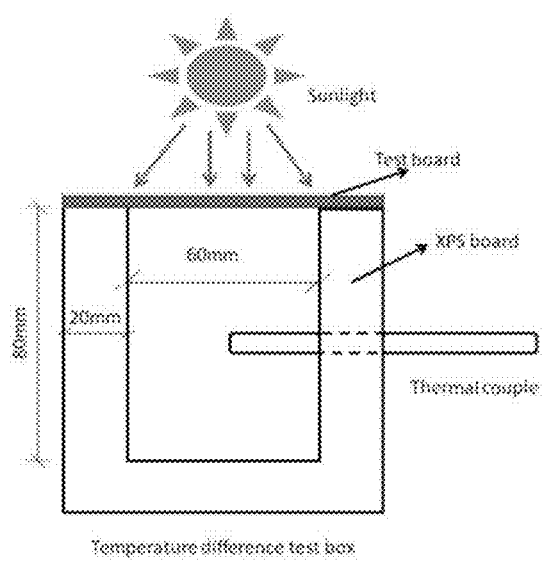

[Fig. 8]
(a)
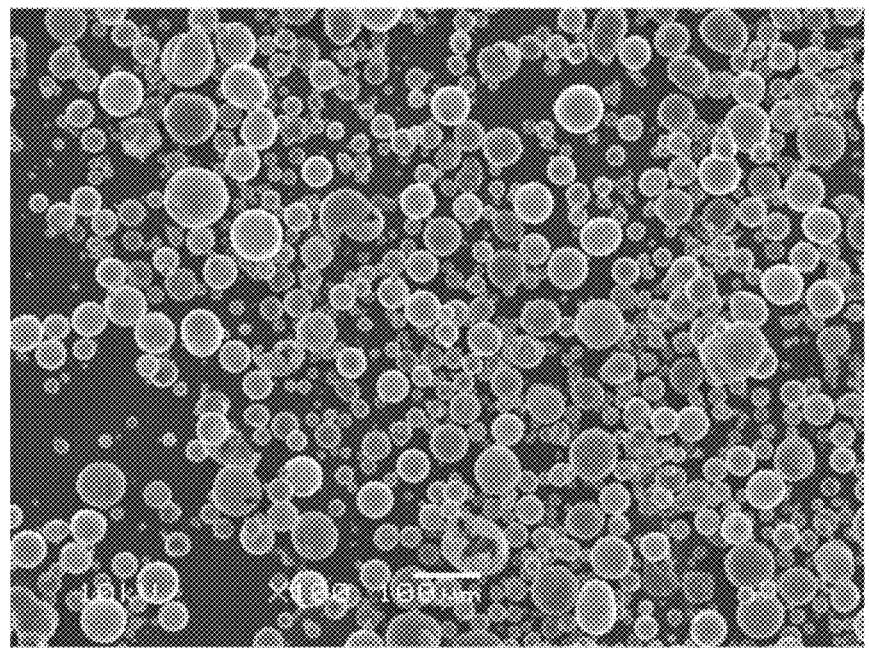
(b)
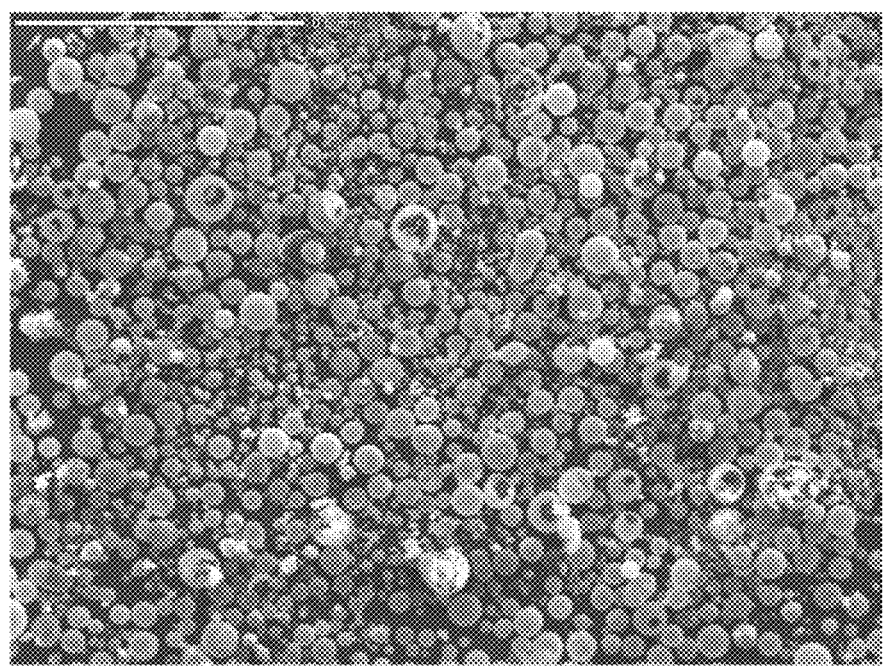

[Fig. 9]
(a)
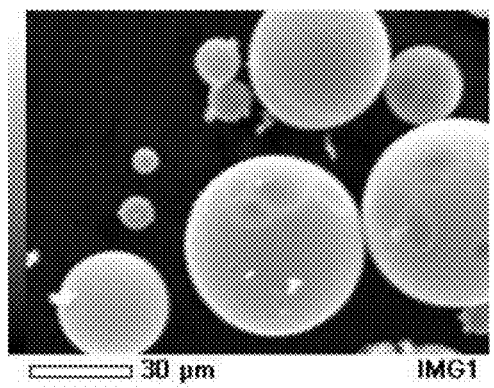
(b)
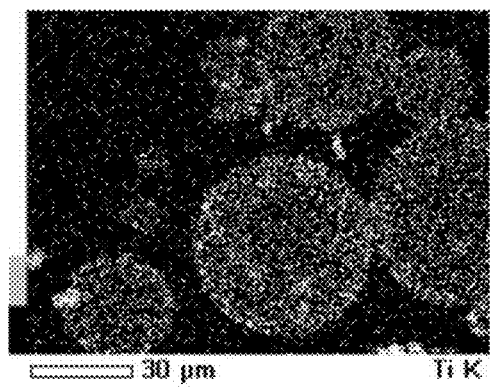
[Fig. 10]
(a)
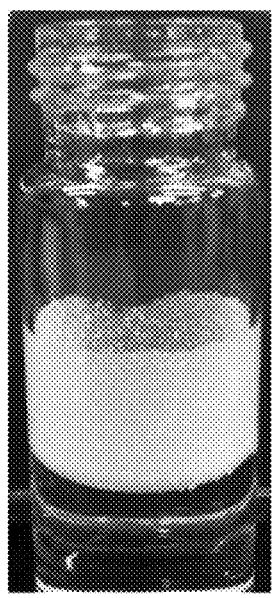
(b)
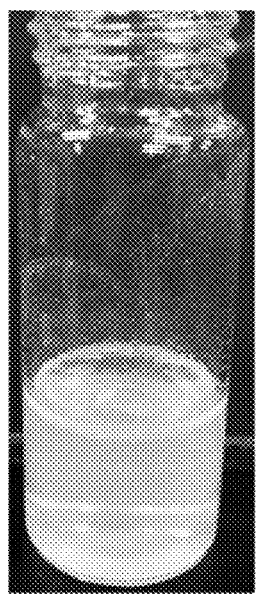

[Fig. 11]
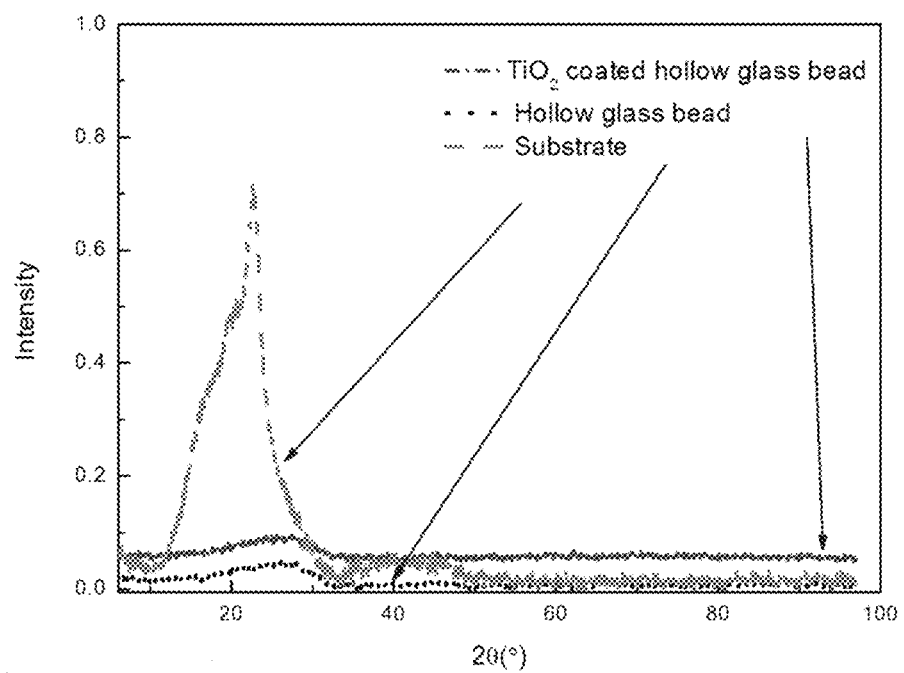

METHOD FOR FORMING A TITANIA-COATED INORGANIC PARTICLE

CROSS REFERENCE TO RELATED APPLICATIONS

This patent application is a divisional application of U.S. patent application Ser. No. 16/326,691, filed 19 Feb. 2019, which is a U.S. National Phase Application Under 35 U.S.C. § 371 of International Application No. PCT/SG2017/050406, filed on 16 Aug. 2017, entitled A METHOD FOR FORMING A TITANIA-COATED PARTICLE, which claims priority from Singapore Patent Application No. 10201606951U filed on 19 Aug. 2016.

TECHNICAL FIELD

The present invention generally relates to a method for forming a titania-coated inorganic particle. The present invention also relates to a method for forming a formulation comprising a titania-coated inorganic particle.

BACKGROUND ART

It is reported that 15% of all electricity consumed worldwide is used to cool buildings. Considering the energy and environment sustainability, it is very important to decrease such electricity consumption. For the existing buildings, the most feasible way is to use cool paint to coat the roof and walls to reduce the electricity consumption for cooling buildings. The principle of cool paint can be summarized in the following details. When a building surface is exposed to sun irradiation, the surface undergoes solar irradiation absorption heating, solar irradiation reflectance cooling, surface emissivity cooling, and thermal conduction to the interior surface. Therefore, paint possessing high solar light reflectance, high thermal emissivity, and low thermal conductivity can be used as cool paint to decrease the electricity consumed for cooling building. In order to confer the above properties to the paint, functional pigments are usually added to paint to allow the paint to function as desired. Therefore, proper and effective cool pigment is important for cool paint. While a number of pigments are known in the art, they suffer from a number of limitations, for example, aerogel (such as silica aerogel, clay aerogel etc) that have low thermal conductivity and can be used as thermal insulation panels, suffer from poor mechanical strength and cannot withstand mixing during paint formulation. In addition, such aerogels also suffer from high synthesis costs due to stringent requirements needed during drying. In addition, for phase change materials (such as organic materials, inorganic materials or eutectics) that are typically used widely in sleeping bags, clothing and electronics, they suffer from the need for encapsulation and require a minimal thickness to work.

There is thus a need to synthesize cool pigments that possess high emissivity, high solar light reflectance and/or low thermal conductivity.

There is a need to provide a method for forming a pigment that overcomes, or at least ameliorates, one or more of the disadvantages described above.

There is a need to provide a method for forming a formulation that comprises a pigment that overcomes, or at least ameliorates, one or more of the disadvantages described above.

SUMMARY

According to a first aspect, there is provided a method for forming a titania-coated inorganic particle comprising the steps of (a) stirring a mixture of a titania precursor and an inorganic particle in an organic solvent for a time period of more than 1 hour to cause adsorption of the titania precursor on the surface of the inorganic particle; and (b) adding water to the mixture under stirring to convert the titania precursor to titania which then forms a coating on the inorganic particle.

According to a second aspect, there is provided a method for forming a paint formulation, comprising the steps of (a) stirring a mixture of a titania precursor and an inorganic particle in an organic solvent for a time period of more than 1 hour to cause adsorption of said titania precursor on the surface of said inorganic particle; (b) adding water to the mixture under stirring to convert said titania precursor to titania which then forms a coating on said inorganic particle; (c) separating the titania-coating inorganic particle from the mixture; and (d) adding said titania-coating inorganic particle to a paint formulation.

The disclosed method of forming the titania-coated inorganic particle is distinguished from the physical method of the prior art in which discrete titania (or titanium dioxide) particles and inorganic particles (in the form of hollow glass beads) are mixed together and physically stirred. The disclosed method thus does not suffer from the disadvantages associated with the physical method such as the large density difference between hollow glass beads (which can be as low as 0.1 g/mL) and titanium dioxide (which is 4.23 g/mL); the agglomeration of titanium dioxide powder; and the low refractive index of hollow glass beads. The former two disadvantages will affect the paint formulation quality and additional technology will be needed to overcome the former two disadvantages during paint formulation. For the last disadvantage, the interface between hollow glass bead and binder is not utilized efficiently, which limits the solar light reflectance of paint.

Advantageously, the present method of forming the titania-coated inorganic particles may solve the above disadvantages. The titania-coating on the inorganic particle may be present on a large area of the surface of the inorganic particle, such as at least 90% (90%, 91%, 92%, 93%, 94%, 95%, 96%, 97%, 98%, 99% or 100%) of the surface of the inorganic particle is coated with the titania-coating. The titania-coating may completely cover the surface of the inorganic particle (that is, a 100% coating coverage). Having this high coverage of the coating on the surface of the inorganic particle may lead to an increase in the interfacial area with refractive index difference, which will increase solar light reflectance of the titania-coated inorganic particles. Depending on whether the inorganic particle is hydrophilic or hydrophobic, the type of bonding between the titania and the inorganic particle will be different. Where the inorganic particle is hydrophilic (or having a hydrophilic treated surface), the present method may be considered as a chemical method that results in the formation of covalent bonds between the titania and the surface of the inorganic particle. Where the inorganic particle is hydrophobic (or having a hydrophobic treated surface), the present method may be considered to be a physical method that results in physical bonding between the titania and the surface of the inorganic particle. The present method results in titania-coated inorganic particles with high solar light reflectance, without any agglomeration of the titania particles. When the titania-coated inorganic particle of the disclosure is used in a paint formulation, due to the increases in the refractive index difference and effective interfacial surface area in the interface between the inorganic particle and the binder, this may lead to an increase in the solar light reflectance.

Advantageously, the density of the titania-coated inorganic particle of the present application may be tuned. Due to the shape of the inorganic particle, which is typically spherical or substantially spherical, the inorganic particle has good fluidity in paint. Thus, the titania-coated inorganic particle will also have good fluidity in paint since the titanit coating does not substantially change the shape of the inorganic particle.

Advantageously, the disclosed method may be undertaken at a neutral pH and ambient conditions. This is a departure from some of the prior art methods which rely heavily on pH control (either highly acidic or highly basic), on temperature control (heating or cooling), surfactant utilization, precipitator utilization, preheating or post annealing treatment of the materials to form the titania from a particular precursor. These controls and treatments usually result in more operation procedures and equipments. In addition, some of the prior art methods require the titania to be in a particular crystal phase to be of use. Hence, the disclosed method may optionally not include any pre-heating step. The disclosed method may optionally not require the use of surfactants in the method. The disclosed method may be widely applicable to titania of any crystal phase and is not limited to requiring the titania to be in a particular crystal phase to be of use.

Advantageously, the disclosed method is more economical than prior art methods while allowing the ability to finely tune the coating conditions to coat the titania coating onto the surface of the inorganic particles without any obvious freestanding titania agglomerates to increase the solar light reflectance property of the titania-coated inorganic particle pigment.

According to a third aspect, there is provided a titania-coated inorganic particle, wherein the titania is amorphous titania.

An advantage of amorphous titania over anatase titania is that the amorphous titania does not have photocatalytic performance, which will not cause photodegradation of binder during application (such as in a paint formulation). Hence, when the amorphous titania-coated inorganic particle is used in a paint formulation, as compared to using anatase titania-hollow glass beads, the amorphous titania-coated inorganic particle may aid to increase the stability of the paint while having comparable solar light reflectance with that of anatase titania-hollow glass beads.

According to a fourth aspect, there is provided a paint formulation comprising a titania-coated inorganic particle, wherein the titania is amorphous titania.

According to a fifth aspect, there is provided use of a titania-coated inorganic particle in a paint formulation, wherein the titania is amorphous titania.

Definitions

The following words and terms used herein shall have the meaning indicated:

The term 'titania' is to be used interchangeably with titanium dioxide, or titanium (IV) oxide, and has the chemical formula $TiO_2$. Titania can exist in the amorphous form, or may be in a crystal form such as rutile, anatase, brookite, or mixtures thereof. Titania can exist as a mixture of amorphous or crystal forms, or a mixture of different amorphous forms, or a mixture of different crystal forms.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

Detailed Disclosure of Embodiments

Exemplary, non-limiting embodiments of method for forming a titania-coated inorganic particle will now be disclosed. The method for forming a titania-coated inorganic particle comprises the steps of (a) stirring a mixture of a titania precursor and an inorganic particle in an organic solvent for a time period of more than 1 hour to cause adsorption of said titania precursor on the surface of said inorganic particle; and (b) adding water to the mixture under stirring to convert said titania precursor to titania which then forms a coating on said inorganic particle.

Advantageously, the disclosed method results in the formation of a titania-coated inorganic particle that may have high emissivity, high solar light reflectance and/or low thermal conductivity. The titania-coated inorganic particle may have a reflectance higher than about 80%, higher than about 81%, higher than about 82%, higher than about 83%, higher than about 84%, higher than about 85%, higher than about 86%, higher than about 87%, higher than about 88%, higher than about 89%, higher than about 90%, higher than about 91%, higher than about 92%, higher than about 93%, higher than about 94%, higher than about 95%, higher than about 96%, higher than about 97%, higher than about 98%, or higher than about 99%. The titania-coated inorganic particle may have an emissivity of higher than about 0.80, higher than about 0.85, higher than about 0.90, higher than about 0.95, or about 1.00. The titania-coated inorganic particle may have a thermal conductivity lower than about 0.3 W/(mK), lower than about 0.2 W/(mK) or lower than about 0.1 W/(mK). This may be due to the high refractive index of the titania coupled with the low thermal conductivity of the inorganic particle.

As compared to the prior art methods, the disclosed method may not require the use of pH or temperature control. Instead, the disclosed method relies on controlling the concentration/amount ratio of the titania precursor, inorganic particle and water. The ratio of the titania precursor (molar) to inorganic particle (g) may be in the range from about 8.0:1 to about 18.0:1 (mmol/g), about 9.0:1 to about 18.0:1 (mmol/g), about 10.0:1 to about 18.0:1 (mmol/g), about 11.0:1 to about 18.0:1 (mmol/g), about 12.0:1 to about 18.0:1 (mmol/g), about 13.0:1 to about 18.0:1 (mmol/g), about 14.0:1 to about 18.0:1 (mmol/g), about 15.0:1 to about 18.0:1 (mmol/g), about 16.0:1 to about 18.0:1 (mmol/g), about 17.0:1 to about 18.0:1 (mmol/g), about 8.4:1 to about 18.0:1 (mmol/g), about 8.0:1 to about 9.0:1 (mmol/g), about 8.0:1 to about 10.0:1 (mmol/g), about 8.0:1 to about 11.0:1 (mmol/g), about 8.0:1 to about 12.0:1 (mmol/g), about 8.0:1 to about 13.0:1 (mmol/g), about 8.0:1 to about 14.0:1 (mmol/g), about 8.0:1 to about 15.0:1 (mmol/g), about 8.0:1 to about 16.0:1 (mmol/g), about 8.0:1 to about 17.0:1 (mmol/g), about 13.0:1 to about 14.0:1 (mmol/g), about 15.0:1 to about 16.0:1 (mmol/g) or about 17.0:1 to about 18.0:1 (mmol/g). In some parts of the description, the ratio may simply be stated as 8 to 18 mmol/g or 8.4 to 18 mmol/g. It is to be appreciated that the above ranges should be interpreted as including and supporting any sub-ranges or discrete values (which may or may not be a whole number) that are within the stated range(s).

The molar ratio of water to titania precursor may be in the range of about 2:1 to about 8:1, about 2:1 to about 7:1, about 2:1 to about 6:1, about 2:1 to about 5:1, about 2:1 to about 4:1, about 2:1 to about 3:1, about 3:1 to about 8:1, about 4:1 to about 8:1, about 5:1 to about 8:1, about 6:1 to about 8:1, or about 7:1 to about 8:1. It is to be appreciated that the above ranges should be interpreted as including and supporting any sub-ranges or discrete values (which may or may not be a whole number) that are within the stated range(s).

By using a mixing (or stirring) time of more than 1 hour, this may aid in facilitating adsorption of the titania precursor onto the surface of the inorganic particle. When the ratio of the various components are controlled together with the mixing (or stirring time), these parameters ensure that the titania is coated onto the surface of the inorganic particle without the formation of freestanding titania particles.

The titania precursor may be a titanium alkoxide. The titanium alkoxide may be a titanium $C_{1-10}$-alkoxide. The titanium $C_{1-10}$-alkoxide may be a $C_{1-4}$-alkoxide selected from the group consisting of titanium methoxide, titanium ethoxide, titanium isopropoxide and titanium butoxide.

The inorganic particle may be a glass particle selected from the group consisting of a silica glass particle, a soda-lime glass particle, a borosilicate glass particle, an aluminosilicate glass particle and mixtures thereof. The glass particle may be a hollow glass particle comprising a glass shell encapsulating an inner void. The inner void may contain air, gas or a vacuum.

The inorganic particle may be of any shape and may typically be a spherical particle. The inorganic particle may be a nanosphere or a microsphere, having a diameter (or equivalent diameter if the inorganic particle is not an exact sphere) that is not particularly limited. The diameter (or equivalent diameter) may be in the range of about 1 nanometer to about 1000 micrometers, about 1 nanometer to about 100 nanometers, about 100 nanometers to about 1 micrometer, about 1 micrometer to about 100 micrometers, about 100 micrometers to about 200 micrometers, or about 50 micrometers to about 100 micrometers.

The inorganic particle may have high mechanical strength, which may be defined by having a crush strength of more than 250 psi. The crush strength of the inorganic particle may be in the range of about 250 psi to about 28,000 psi, such as about 250 psi, about 300 psi, about 400 psi, about 500 psi, about 750 psi, about 2,000 psi, about 3,000 psi, about 4,000 psi, about 5,500 psi, about 6,000 psi, about 10,000 psi, about 18,000 psi, or about 28,000 psi (and ranges therebetween).

The organic solvent used may be an alcohol. The alcohol solvent is one that is not particularly limited as long as it is miscible with an aqueous solution (such as water) and allow for good dispersion with the inorganic particles (be it hydrophobic or hydrophilic inorganic particles). An exemplary alcohol solvent may be ethanol or isopropanol.

The titania precursor may be added to the organic solvent first at the ratio mentioned above to form a solution, followed by the addition of the inorganic particle to form a suspension. The resultant suspension mixture may be stirred for more than one hour, or more than two hours, or for two hours. The resultant suspension mixture may be stirred at any stirring speed that can ensure good mixture of the suspension. Exemplary stirring speed can be about 200 rpm to about 300 rpm.

After stirring (step (a)), water is added to the mixture (or suspension mixture) under stirring in a controlled manner. The water may be added to the mixture drop-wise (or as water droplets). During the addition of the water, the suspension mixture is stirred. Here, the stirring in step (b) is undertaken for more than one hour, or more than two hours, or for two hours.

The method may be undertaken at neutral pH. The method may not require explicit control of the pH or addition of pH control agents such as an acid or a base. The method may be conducted at the pH of the solvent used in the method. The pH may be about 7 (±0.5).

The method may be undertaken at ambient temperatures, such as at room temperature (of about 25° C. to about 30° C.). The method may thus not require any additional heating or cooling steps in order to control the temperature. The method may also not require the use of pre-heating, which is used in a prior art method to remove physically absorbed water from the surface of the inorganic particle.

The method may further comprise the step of (c) separating the titania-coated inorganic particle from the (suspension) mixture. The separating step may be a filtering step which would be known to a person skilled in the art. The filtered particle may be subjected to a washing step with water or an alcohol to remove any excess titania precursor.

The method may further comprise the step of (d) drying the titania-coated inorganic particle (that is filtered and/or washed) at a temperature in the range of 25° C. to 100° C. The drying step is undertaken to remove the washing medium (such as water or alcohol). The method may optionally not require heating the dried titania-coated inorganic particle at a temperature above 500° C. in order to obtain a desired crystal form of the titania or to anneal the titania coating to the inorganic particle.

The disclosed method may form a titania-coated inorganic particle having a titania coating thickness of about 50 nm to about 300 nm, about 50 nm to about 100 nm, about 50 nm to about 150 nm, about 50 nm to about 200 nm, about 50 nm to about 250 nm, about 100 nm to about 300 nm, about 150 nm to about 300 nm, about 200 nm to about 300 nm, or about 250 nm to about 300 nm. The thickness may be about 200 nm. The density of the titania-coated inorganic particle may be tuned or controlled by the disclosed method by controlling the ratio of titania precursor to the inorganic particle, the ratio of water to the titania precursor or the type of washing medium. The density of the titania-coated inorganic particle may be in the range of about 0.10 g/mL to about 1 g/mL, about 0.10 g/mL to about 0.9 g/mL, about 0.10 g/mL to about 0.8 g/mL, about 0.10 g/mL to about 0.7 g/mL, about 0.10 g/mL to about 0.6 g/mL, about 0.10 g/mL to about 0.5 g/mL, about 0.10 g/mL to about 0.4 g/mL, about 0.10 g/mL to about 0.3 g/mL, about 0.10 g/mL to about 0.2 g/mL, about 0.20 g/mL to about 1 g/mL, about 0.30 g/mL to about 1 g/mL, about 0.40 g/mL to about 1 g/mL, about 0.50 g/mL to about 1 g/mL, about 0.60 g/mL to about 1 g/mL, about 0.70 g/mL to about 1 g/mL, about 0.80 g/mL to about 1 g/mL, about 0.90 g/mL to about 1 g/mL, about 0.15 to about 0.30 g/mL, about 0.15 to about 0.20 g/mL, about 0.15 to about 0.25 g/mL, about 0.20 to about 0.30 g/mL, about 0.25 to about 0.30 g/mL, about 0.19 to about 0.20 g/mL, or about 0.26 to about 0.27 g/mL.

Exemplary, non-limiting embodiments of method for forming a paint formulation will now be disclosed. The method for forming a paint formulation comprises the steps of: (a) stirring a mixture of a titania precursor and an inorganic particle in an organic solvent for a time period of more than 1 hour to cause adsorption of said titania precursor on the surface of said inorganic particle; (b) adding water to the mixture under stirring to convert said titania precursor to titania which then forms a coating on said inorganic particle; (c) separating the titania-coating inorganic particle from the mixture; and (d) adding said titania-coating inorganic particle to a paint formulation.

Steps (a) to (c) of this method are substantially similar to the steps (a) to (c) of the method for forming a titania-coated inorganic particle mentioned above and the same conditions/criteria apply here as well.

The titania-coated inorganic particle may be added to the paint formulation at a weight % of about 1 to about 20 wt %, about 1 to about 5 wt %, about 1 to about 10 wt %, about 1 to about 15 wt %, about 5 to about 20 wt %, about 10 to about 20 wt % or about 15 to about 20 wt %. As is known in the art, paint typically contains four essential ingredients, such as pigment, binder, liquid and additives. The paint formulation is one that is not particularly limited and can be any paint formulation that requires enhancement to the solar heat reflectance and thermal insulation properties.

There is provided a titania-coated inorganic particle, wherein the titania is amorphous titania. The titania coating may have a thickness, density and coverage as mentioned above.

There is provided a paint formulation comprising a titania-coated inorganic particle, wherein the titania is amorphous titania. The titania-coated inorganic particle may be present in the paint formulation at a weight % as defined above. There is also provided use of a titania-coated inorganic particle in a paint formulation, wherein the titania is amorphous titania.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 2 is a series of scanning electron microscopy (SEM) images of (a) K1 hollow glass beads at a magnification of ×350 and (b) the corresponding film after brush coating at a magnification of ×100.

FIG. 3 is a series of SEM images of (a) K25 hollow glass beads at a magnification of ×100 and (b) the corresponding film after brush coating at a magnification of ×100.

FIG. 4 is a series of elemental mapping images of titania-coated hollow glass beads where (a) and (b) are based on the sample HGB@$TiO_2$-3.1/2:1/ethanol/80 (at a scale of 100 pin) and (c) and (d) are based on the sample HGB@$TiO_2$-4.65/2:1/ethanol/80 (at a scale of 50 μm).

FIG. 5 is a series of SEM images of (a) K25 hollow glass beads at a magnification of ×100, (b) HGB@$TiO_2$-3.1/2:1/ethanol/80 at a magnification of ×100, (c) HGB@$TiO_2$-4.65/2:1/ethanol/80 at a magnification of ×100, and (d) HGB@$TiO_2$-4.65/2:1/water/80 at a magnification of ×100.

FIG. 6 is a series of SEM cross-sectional images of (a) hollow glass beads at a magnification of ×7,000, (b) hollow glass beads at a magnification of ×9,000, (c) HGB@$TiO_2$-4.65/2:1/water/80 at a magnification of ×15,000 and (d) HGB@$TiO_2$-4.65/2:1/water/80 at a magnification of ×16,000.

FIG. 7 is a schematic diagram illustrating a self-made temperature difference test box.

FIG. 8 is a series of SEM images of (a) hydrophobic hollow glass bead (uncoated) at a magnification of ×100, with the inset at a magnification of ×1,000, and (b) HGB (Hydrophobic)@$TiO_2$-4.96/2:1/ethanol/80 at a scale of 0.5 mm, with the inset at a scale of 25 μm.

FIG. 9 is a series of elemental mapping images of (a), (b) HGB(Hydrophobic)@$TiO_2$-4.96/2:1/ethanol/80, both at a scale of 30 μm.

FIG. 10 is a series of photographs showing the dispersion of (a) original hydrophobic hollow glass beads and (b) titania-coated hydrophobic hollow glass beads in water.

FIG. 11 is a graph showing the X-Ray Diffraction pattern of titania-coated hollow glass bead.

DETAILED DESCRIPTION OF DRAWINGS

Figure 1:
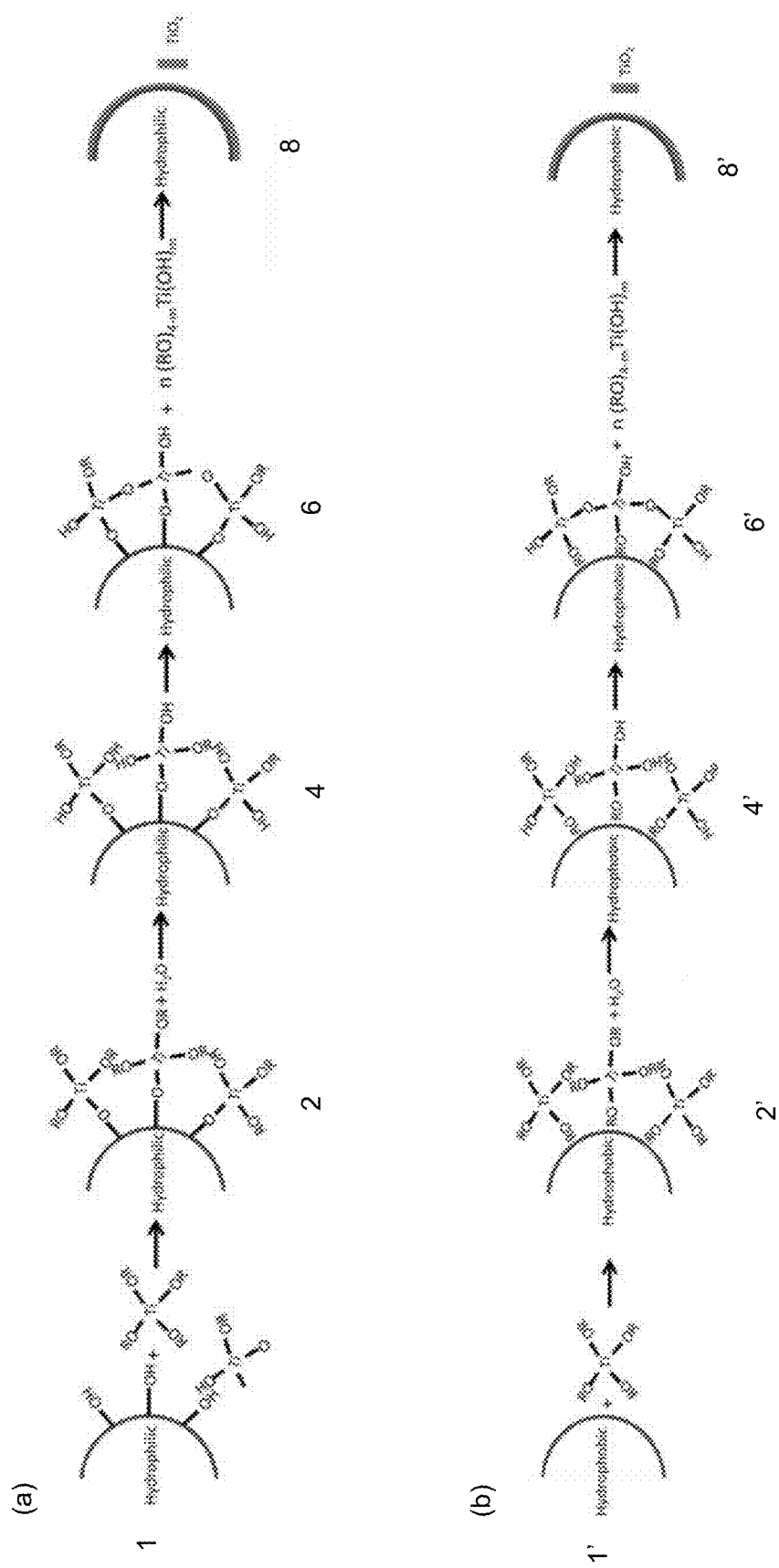
FIG. 1 is a reaction scheme showing the formation of a titania coating on the surface of a (a) hydrophilic hollow glass bead; and (b) hydrophobic hollow glass bead.

Referring to FIG. 1, there is provided a reaction scheme showing the formation of a titania coating on the surface of a (a) hydrophilic hollow glass bead; and (b) hydrophobic hollow glass bead.

As shown in FIG. 1(a), the surface of a hydrophilic hollow glass bead 1 is shown. When the titania precursor such as titanium alkoxide is added to the hydrophilic hollow glass bead 1, after a sufficient long mixing time, the alkoxy group in titanium alkoxide may facilitate adsorption of titanium alkoxide on the surface of hydrophilic hollow glass bead 1 by reacting with the surface hydroxyl (—OH) groups to form —Ti—O-(hollow glass bead) covalent bonds (as seen in 2). When a controlled amount of water is added, hydrolysis occurs, converting some of the alkoxide groups to hydroxyl groups (as seen in 4). Polycondensation then occurs where titania seeds are formed on the surface of the hollow glass bead due to the relatively high concentration of titanium alkoxide on the surface of the hollow glass beads as compared with that in solution (as seen in 6). The titania seeds then facilitate the titania film formation on the surface of the hollow glass bead (as seen in 8).

As seen in FIG. 1(b), the surface of a hydrophobic hollow glass bead 1' is shown. When the titania precursor such as titanium alkoxide is added to the hydrophobic hollow glass bead 1', after a sufficient long mixing time, the alkoxy group in titanium alkoxide may facilitate adsorption of titanium alkoxide on the surface of hydrophobic hollow glass bead 1' (as seen in 2') by physical bonds. When a controlled amount of water is added, hydrolysis occurs, converting some of the alkoxide groups to hydroxyl groups (as seen in 4'). Polycondensation then occurs where titania seeds are formed on the surface of the hollow glass bead due to the relatively high concentration of titanium alkoxide on the surface of the hollow glass beads as compared with that in solution (as seen in 6'). The titania seeds then facilitate the titania film formation on the surface of the hydrophobic hollow glass bead (as seen in 8').

Thus, the titanium alkoxides undergo hydrolysis (to form Ti—O—H bonds) and polycondensation to form three-dimensional structures with Ti—O—Ti bond when reacted with water. The morphology of titania is highly dependent on the relative reaction rate of hydrolysis and polycondensation, which is also strongly affected by the concentration of water. In order to achieve full coverage of hollow glass bead with titania, this requires careful control of mixing time, the molar ratio of water to titania precursor, and ratio of the titania precursor to the inorganic particle.

EXAMPLES

Non-limiting examples of the invention and a comparative example will be further described in greater detail by reference to specific Examples, which should not be construed as in any way limiting the scope of the invention.

Example 1

Coating Titania on Surface of Hollow Glass Bead

Tetrabutyl titanate (obtained from Sigma Aldrich of St. Louis of Missouri of the United States of America) was added to 72 mL of anhydrous ethanol. 0.6 g of K25 hollow glass bead (obtained from 3M Company of Minnesota of the United States of America), which is hydrophilic, was added into the solution with ratio of titanium alkoxide (molar) to hollow glass bead (g) in the range from 8 to 18 mmol/g and stirred for 2 hours. Water was added drop wise to the suspension at a molar ratio of water to tetrabutyl titanate in the range of 2:1 to 8:1 and stirred mechanically for 2 hours. The suspension was filtered and the titania coated hollow glass beads washed with water or ethanol. The titania coated hollow glass beads were dried at room temperature (of about 25° C.) or at temperature lower than 100° C. The titania coated hollow glass bead samples were collected and named as HGB@$TiO_2$-A/B/C/D, where A represents the ratio of tetrabutyl titanate to hollow glass bead with unit of mL/g, B represents the molar ratio of water to tetrabutyl titanate, C represents the substance used to wash the sample, and D represents the temperature used to dry the sample.

For coating titania or $TiO_2$ onto the surface of hydrophobic hollow glass bead, the same process and parameters are utilized, and the sample is named HGB(hydrophobic)@$TiO_2$-A/B/C/D.

Example 2

Paint Formulation

Example 2a

HGB@$TiO_2$-4.65/4:1/water/80 was added to binder A form paint. Binder A is a mixture of copolymer (which is Acronal® S 400, obtained from BASF SE of Ludwigshafen of Germany) and 20 wt % of calcium carbonate. The paint was coated onto a glass substrate. After each coating, the wet film was dried at room temperature (of about 25° C.) for 24 hours. The coating and drying operations were repeated. The thickness of the dry film ranged between 0.1 mm and 1 mm based on the coating times and wet film thickness control.

Example 2b the same steps as Example 2a was carried out here, but using sample HGB@$TiO_2$-4.65/2:1/water/80.

Example 2c

Pigments were added to binder A to form paint. The pigment is one of the following pigments: hollow glass bead, hollow glass bead and $TiO_2$ physical mixture, $TiO_2$ coated hollow glass bead, and HGB@$TiO_2$-4.65/2:1/water/80. The paint was coated onto the surface of a biaxially oriented polypropylene (BOPP) film. After each coating, the wet film was dried at room temperature (of about 25° C.) for 24 hours. The coating and drying operations were repeated. The thickness of the dry film was around 1 mm. The BOPP film was peeled off to get the freestanding coating for thermal conductivity test.

Example 2d

Pigments were added to binder B, which is Acronal® S 400 to form paint. The paint was coated onto a cement substrate. After each coating, the wet film was dried at room temperature (of about 25° C.) for 24 hours. The coating and drying operations were repeated. The thickness of the dry film ranged between 0.8 mm and 1 mm based on the coating times and wet film thickness control.

Example 2e

Hollow glass bead K1 or K25 (3M) were added to Binder B Acronal® S 400 such that the concentration of the hollow glass bead in paint is 10 w %. This suspension was stirred, then the suspension was brush-coated on the surface of a BOPP film. The film was dried at room temperature for SEM test.

Example 3

Characterization and Performance Test of Sample

Scanning electron microscopy (SEM, JEOL LV SEM 6360LA) and energy dispersive spectroscopy (JEOL JED-2300 EDX) were used to test the surface morphology, $TiO_2$ dispersion, and $TiO_2$ layer thickness of $TiO_2$ coated hollow glass beads. Optima 5300 DV inductively coupled plasma optical emission spectrometer (ICP-OES, Perkin-Elmer) was used to test the concentration of $TiO_2$ in the $TiO_2$ coated hollow glass bead. UV-VIS-NIR spectrophotometer UV-3600 (Shimadzu) with integrating sphere ISR 3100 was used to test the diffusive solar reflectance of the pigment.

FIG. 2 shows the SEM images of (a) K1 hollow glass beads and (b) the corresponding film after brush coating as mentioned in Example 2e. The hollow glass beads possess isostatic crush strength of 250 psi and thermal conductivity of 0.047 W/(m·K).

FIG. 3 shows the SEM images of (a) K25 hollow glass beads and (b) the corresponding film after brush coating as mentioned in Example 2e. The hollow glass beads possess isostatic crush strength of 750 psi and thermal conductivity of 0.085 W/(m·K).

In order to make use of the thermal insulation property of hollow glass beads, it is necessary to maintain the integrity of the hollow glass bead after coating. Brush coating is the commonly used method to coat paint onto a surface. FIG. 2(b) shows that after brush coating, some of the hollow glass beads with isostatic crush strength of 250 psi were broken. FIG. 3(b) shows that hollow glass beads with isostatic crush strength of 750 psi can withstand the brush coating. Therefore, K25 hollow glass beads were selected for $TiO_2$ coated hollow glass bead synthesis.

FIG. 4 shows the results of elemental mapping using SEM EDS where the $TiO_2$ coating on the surface of hollow glass beads was characterized. FIG. 4 shows that $TiO_2$ can be coated onto hollow glass bead by using the disclosed method for samples HGB@$TiO_2$-3.1/2:1/ethanol/80 (FIG. 4a) and of HGB@$TiO_2$-4.65/2:1/ethanol/80 (FIG. 4b).

FIG. 5 shows the surface morphologies of $TiO_2$ coated hollow glass beads. It can be seen that $TiO_2$ can be coated onto the surface of hollow glass beads without obvious freestanding $TiO_2$ agglomerate formation (when comparing FIG. 5b, FIG. 5c and FIG. 5d to FIG. 5a). The ratio of titanium alkoxide (molar) to hollow glass bead (g) was controlled in the range from 8.4 to 18 mmol/g. The molar ratio of water to titanium alkoxide was controlled in the range from 2:1 to 8:1.

FIG. 6 shows the cross sectional SEM images for $TiO_2$ coated hollow glass bead confirming the formation of a $TiO_2$ layer onto the surface of hollow glass beads. The thickness of the $TiO_2$ layer is around 162 nm in FIG. 6c and 231 nm in FIG. 6d.

Table 1 below shows the solar light reflectance property of the various samples based on the measurement of diffusive solar light reflectance of the sample powder. The results show that the samples washed by water showed higher diffusive solar light reflectance compared to that of samples washed by ethanol. For samples washed with ethanol, samples dried at room temperature showed higher performance compared to that of samples dried at 50° C. and 80° C. For samples washed with water, when the drying temperature was higher than 80° C., the diffusive solar light reflectance decreased. Therefore, drying temperature lower than 100° C. was favorable for $TiO_2$ coated hollow glass bead synthesis considering the energy cost and the diffusive solar light reflectance performance.

Table 1 also shows that $TiO_2$ coated hollow glass bead samples had higher diffusive solar light reflectance than that of physical mixtures of $TiO_2$ particles and hollow glass bead particles.

TABLE 1

Diffusive solar light reflectance of various samples

| Sample | Diffusive solar reflectance (%) |
|---|---|
| HGB@$TiO_2$-4.65/2:1/ethanol/room temperature | 89.61 |
| HGB@$TiO_2$-4.65/2:1/ethanol/50 | 87.12 |
| HGB@$TiO_2$-4.65/2:1/ethanol/80 | 87.33 |
| HGB@$TiO_2$-4.65/2:1/ethanol/110 | 90.08 |
| HGB@$TiO_2$-4.65/2:1/ethanol/150 | 89.10 |
| HGB@$TiO_2$-4.65/2:1/water/room temperature | 90.11 |
| HGB@$TiO_2$-4.65/2:1/water/50 | 90.64 |
| HGB@$TiO_2$-4.65/2:1/water/80 | 92.09 |
| HGB@$TiO_2$-4.65/2:1/water/110 | 90.15 |
| HGB@$TiO_2$-4.65/2:1/water/150 | 89.68 |

TABLE 1-continued

Diffusive solar light reflectance of various samples

| Sample | Diffusive solar reflectance (%) |
|---|---|
| HGB@$TiO_2$-3.1/2:1/ethanol/80 | 87.7 |
| HGB@$TiO_2$-5.43/2:1/ethanol/80 | 90.5 |
| HGB@$TiO_2$-6.5/2:1/ethanol/80 | 90.8 |
| HGB@$TiO_2$-4.65/8:1/water/80 | 99.96 |
| HGB@$TiO_2$-4.65/4:1/water/80 | 97.82 |
| Physical mixture of HGB and $TiO_2$* | 95.92 |
| Hollow glass bead | 82.85 |
| Amorphous $TiO_2$ | 95.98 |

*$TiO_2$ concentration in the physical mixture is the same as that of HGB@$TiO_2$-4.65/4:1/water/80. The physical mixture was made by mixing specific amounts of hollow glass beads and amorphous $TiO_2$ according to the weight ratio of hollow glass beads to $TiO_2$ in HGB@$TiO_2$-4.65/4:1/water/80.

In order to test the effect of $TiO_2$ on the density of $TiO_2$ coated hollow glass beads, the density of $TiO_2$ coated hollow glass beads was obtained by separated mass and volume measurement. The results (Table 2) show that $TiO_2$ coating can tune the density of $TiO_2$ coated hollow glass beads.

TABLE 2

Density and $TiO_2$ content of $TiO_2$ coated hollow glass bead samples

| Sample | Bulk density ρ (g/mL) | $TiO_2$ concentration (w %) | $\rho_{HGB@TiO2}$-$\rho_{HGB}$ |
|---|---|---|---|
| Hollow glass beads | 0.1599 | — | — |
| HGB@$TiO_2$-4.65/2:1/ethanol/80 | 0.1955 | 20 | 1.223 |
| HGB@$TiO_2$-4.65/2:1/water/80 | 0.1954 | 20 | 1.222 |
| HGB@$TiO_2$-4.65/4:1/water/80 | 0.2658 | 50 | 1.662 |

Example 4

Characterization and Performance Test of Paint

Total solar light reflectance was tested using UV-VIS-NIR spectrophotometer UV-3600 (Shimadzu) with integrating sphere ISR 3100 according to ASTM E903-96 and ASTM G159-98. Thermal conductivity was tested by using LFA 457 Microflash laser flash system (NETZSCH). Temperature difference test was conducted using the self-made temperature difference test box (shown in FIG. 7). The temperature of the center of the test box was recorded during the test. The temperature difference (ΔT) between test boxes with reference test board ($T_{reference}$) and sample test board ($T_{sample}$) can be calculated using the following equation: $\Delta T = T_{reference} - T_{sample}$.

Table 3 shows the solar light reflectance of paint formulated with $TiO_2$ coated hollow glass beads, according to the methods listed in Examples 2a and 2b. The paint formulated with $TiO_2$ coated hollow glass beads shows higher total solar light reflectance compared with that of paint formulated with hollow glass beads. When the concentration of HGB@$TiO_2$-4.65/2:1/water/80 was 7.4 w %, and the volume concentration of HGB was the same as that of HGB@$TiO_2$-4.65/2:1/water/80 in paint, the total solar light reflectance increased from 75.08% to 79.93%. The paint formulated with $TiO_2$ coated hollow glass beads showed higher total solar light reflectance compared with that of paint formulated with $TiO_2$ and hollow glass beads physical mixture. When the concentration of HGB@$TiO_2$-4.65/2:1/water/80 was 17.4 w %, and $TiO_2$ concentration in the physical mixture was the same as that of HGB@ TiO$_2$-4.65/2:1/water/80, the total solar light reflectance increased from 83.64% to 85.74%.

pared according to the method of Example 2c. Table 4 shows that adding TiO$_2$ coated hollow glass beads into the binder can decrease the thermal conductivity of the binder by 76%. Paint formulated with TiO$_2$ coated hollow glass bead shows lower thermal conductivity than that of paint formulated with physical mixture of TiO$_2$ and hollow glass bead.

TABLE 3

Total solar light reflectance of cool paints formulated with TiO$_2$ modified hollow glass beads

| Sample | Total solar light reflectance (%) | Concentration of pigment (w %) | Coating times | Film thickness (mm) |
|---|---|---|---|---|
| Original binder | 48.92 | — | 4 | 0.916 |
| Hollow glass beads | 75.08 | * | 4 | 1.000 |
| HGB@TiO$_2$-4.65/2:1/water/80 | 79.93 | 7.4[a] | 4 | 0.935 |
| HGB@TiO$_2$-4.65/2:1/water/80 | 81.55 | 11.8 | 3 | 0.800 |
| HGB@TiO$_2$-4.65/2:1/water/80 | 84.85 | 15.9 | 3 | 0.880 |
| HGB@TiO$_2$-4.65/2:1/water/80 | 85.19 | 16.8 | 3 | 0.860 |
| HGB@TiO$_2$-4.65/2:1/water/80 | 85.74 | 17.4 | 3 | 0.860 |
| HGB TiO$_2$ physical mixture[#] | 83.64 | 17.4 | 3 | 0.850 |
| HGB@TiO$_2$-4.65/4:1/water/80 | 86.27 | 18.9 | 3 | 0.860 |
| HGB@TiO$_2$-4.65/4:1/water/80 | 87.36 | 20 | 3 | 0.863 |

*the volume concentration of HGB in the paint is the same as that of the TiO$_2$ modified HGB in the paint[a]
[#]TiO$_2$ concentration in the physical mixture is the same as that of HGB@TiO$_2$-4.65/2:1/water/80

In order to test the effect of TiO$_2$ coated hollow glass beads on the thermal conductivity of paint, paint was pre-

TABLE 4

Thermal conductivity of cool paint

| Sample (name paint with pigment utilized) | Thermal conductivity (W/m K) | Concentration of pigment (w %) |
|---|---|---|
| Binder | 0.559 | NA |
| Hollow glass bead* | 0.098 | * |
| Physical mixture of hollow glass bead and TiO$_2$[#] | 0.150 | 16.8 |
| HGB@TiO$_2$-4.65/2:1/water/80 | 0.133 | 16.8 |

*The volume concentration of hollow glass bead in the binder is the same as that of HGB@TiO$_2$-4.65/2:1/water/80 in the binder
[#]The concentration of TiO$_2$ in pigment composed of physical mixture of TiO$_2$ and hollow glass bead is the same as that in TiO$_2$ coated hollow glass bead HGB@TiO$_2$-4.65/2:1/water/80

In order to test the cooling performance of paint formulated with TiO$_2$ coated hollow glass beads, a temperature difference test was conducted under sunlight irradiation. The results are shown in Table 5.

TABLE 5

Temperature difference test for various formulated paints with different pigments[#]

| Sample 1 | Sample 2 | Cooling performance (° C.)* | Weather condition |
|---|---|---|---|
| Cement board | Cement board coated with paint which is formulated with TiO$_2$ coated hollow glass bead[a] | 8.7 | Date: 2 Aug. 2015 Time: 12:30 PM-15:10 PM Address: 3 Research Link, Singapore Temperature: 31-33° C. Feels like: 37-38° C. Wind: 16 km/h-23 km/h Humidity: 66-55% |
| Cement board coated with paint which is formulated with TiO$_2$ and hollow glass bead physical mixture[b] | Cement board coated with paint which is formulated with TiO$_2$ coated hollow glass bead | 1.2 | Date: 8 Oct. 2015 Time: 11:10AM-1:00 PM Address: 1 Fusionopolis Place, Singapore Temperature: 32° C. Feels like: 36° C. Wind: 11 km/h Humidity: 55% |
| Cement board coated with paint which is formulated with hollow glass bead[c] | Cement board coated with paint which is formulated with TiO$_2$ coated hollow glass bead | 1.5 | Date: 8 Oct. 2015 Time: 1:30 PM-2:15 PM Address: 1 Fusionopolis Place, Singapore Temperature: 32° C. Feels like: 35° C. Wind: 13 km/h Humidity: 52% |

*Cooling performance = $T_{sample\ 1} - T_{sample\ 2}$, T is the inner space temperature of test box with corresponding test board;
[#]TiO$_2$ coated hollow glass bead is HGB@TiO2-4.65/2:1/water/80, hollow glass bead is K25, TiO$_2$ in physical mixture of TiO$_2$ and hollow glass bead is amorphous TiO$_2$
[a]the concentration of TiO$_2$ coated hollow glass bead is 6 w %;
[b]The concentration of hollow glass bead and TiO$_2$ are the same as that of TiO$_2$ coated hollow glass bead in[a];
[c]The volume concentration of hollow glass bead is the same as that of TiO$_2$ coated hollow glass bead in[a]

The results show that paint formulated with cool pigment developed in this application showed the highest cooling performance. The cool paint can decrease the room temperature of test box roofed with cement board by 8.7° C. The cooling performance of cool paint formulated with as-prepared cool pigment was also compared with that of the paint formulated with hollow glass bead only and physical mixture of hollow glass bead and $TiO_2$, respectively. The results show that the cooling performance of cool paint formulated with as-prepared cool pigment in this application was at least 1.2° C. higher than that of hollow glass bead and physical mixture of hollow glass bead and $TiO_2$. These results suggest the strong cooling performance of cool pigment developed in this application.

Example 5

Coating on Hydrophobic Hollow Glass Beads

Here, $TiO_2$ is also coated onto the surface of hydrophobic hollow glass bead (NIPO PTE LIMITED of Singapore) without obvious freestanding $TiO_2$ agglomerate formation.

FIG. 8(a) shows the SEM image of the original (uncoated) hydrophobic hollow glass bead while FIG. 8(b) shows the SEM image of the sample HGB(hydrophobic)@$TiO_2$-4.96/2:1/ethanol/80. This shows that the $TiO_2$ was able to form a uniform coating on the surface of hydrophobic hollow glass beads without any free standing $TiO_2$ agglomerate formation. This is also confirmed by the elemental mapping image in FIG. 9(a) and FIG. 9(b). FIG. 10 shows the dispersion of (a) original hydrophobic hollow glass beads in water and (b) $TiO_2$ coated hydrophobic hollow glass bead in water. The dispersion of hydrophobic hollow glass beads in water was increased due to the $TiO_2$ coating.

These results suggest the wide application scope of this application to coat $TiO_2$ onto the surfaces of both hydrophilic and hydrophobic hollow glass beads.

FIG. 11 shows the XRD pattern of $TiO_2$ coated hollow glass beads (that are hydrophobic). FIG. 11 shows that after subtracting the XRD pattern of hollow glass bead and substrate, $TiO_2$ coated hollow glass beads does not show any peak, suggesting the amorphous structure of $TiO_2$ in the $TiO_2$ coated hollow glass beads.

Comparative Example

The titania-coated hollow glass beads were compared against a number of market products. In market, most cool paints focus on utilization of only solar light reflectance property and some paint products have both solar light reflectance and low thermal conductivity properties. Some products from companies in the market which show the certified properties are shown in Table 6.

TABLE 6

Comparison with market products

| Product | Total solar light reflectance (%) | Thermal conductivity (W/mK) | $TiO_2$ content (w %) | Company |
|---|---|---|---|---|
| FECOAT 1000 UF 1001 WHITE | 85* | No thermal insulation property mentioned | 7-10# | BASF |

TABLE 6-continued

Comparison with market products

| Product | Total solar light reflectance (%) | Thermal conductivity (W/mK) | $TiO_2$ content (w %) | Company |
|---|---|---|---|---|
| Thermoshield White | 84$ | 0.142$ | 10-30$ | Thermoshield Australia Pty Ltd |
| HGB@$TiO_2$-4.65/2:1/water/80 | 85.19 | 0.133 | 3.4 | — |

*The data is obtained from Energy Star (https://www.energystar.gov/productfinder/product/certified-roofproducts/?scrollTo=103&search_text=&energy_star_partner_isopen=1&brand_name_isopen=&zip_code_filter=&product_types=Select+a+Product+Category&energy_star_partner_filter=BASF + Corporation)
FECOAT 1000 UF 1001 WHITE Safety Datasheet 2015, version 3.1
$The data is obtained from company website: http://www.thermoshield.com.au/technical-data.html Comparing market products with the $TiO_2$ coated hollow glass beads of the application, when the total solar light reflectance is almost the same, the content of $TiO_2$ used in this application is much lower. Comparing the disclosed cool paint with Thermoshield White, the thermal conductivity of the disclosed cool paint is lower. It is common knowledge in industry that using high content of $TiO_2$ will induce high total solar light reflectance, however, $TiO_2$ is expensive and possesses a large carbon footprint. In this application, $TiO_2$ is coated uniformly onto the surface of hollow glass bead without any obvious free standing agglomerates, which will make full use of the effective interfacial surface area. This therefore results in achieving high total solar reflectance with lower content of $TiO_2$.

INDUSTRIAL APPLICABILITY

The disclosed method may be able to form titania-coated inorganic particles that are used in a formulation. The titania-coated inorganic particles may be used in a paint formulation to impart desired properties such as high solar light reflectance, low thermal conductivity and/or high emissivity.

The disclosed method may avoid the problem of freestanding agglomerates of titanium dioxide particles. The disclosed method may not require controlling the crystal phase of titanium dioxide. The disclosed method may control the rate of $TiO_2$ coating formation by controlling the ratio between the titania precursor, inorganic particles and water. The disclosed method may not require the use of pH control or temperature control. The disclosed method may not require the use of pre-heating or complicated post-treatment steps.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A titania-coated inorganic particle, wherein said titania of the titania-coated inorganic particle is amorphous titania, and wherein said titania-coated inorganic particle has a density in the range of 0.1 g/mL to 1 g/mL.

2. The titania-coated inorganic particle of claim 1, wherein said titania coating of the titania-coated inorganic particle is of a thickness in the range of 50 nm to 300 nm.

3. The titania-coating inorganic particle of claim 1, wherein the titania coating is disposed on at least 90% of the surface of said inorganic particle.

\* \* \* \* \*